United States Patent [19]

Kovenklioglu et al.

[11] Patent Number: 5,196,617
[45] Date of Patent: Mar. 23, 1993

[54] METHOD OF HYDRODEHALOGENATING HALOGENATED ORGANIC COMPOUNDS IN AQUEOUS ENVIRONMENTAL SOURCES

[75] Inventors: Suphan Kovenklioglu, Chatham; Edward N. Balko, Middletown; Jeffrey B. Hoke, North Brunswick; Robert J. Farrauto, Westfield; Gary A. Gramiccioni, Flemington, all of N.J.

[73] Assignee: Engelhard Corporation, Iselin, N.J.

[21] Appl. No.: 820,458

[22] Filed: Jan. 14, 1992

[51] Int. Cl.$^5$ .................. C07C 17/00; C07C 17/34; C07C 39/24

[52] U.S. Cl. .................. 570/204; 568/755; 568/774; 570/190; 570/216; 570/220; 570/226; 570/227; 570/228; 570/230

[58] Field of Search .............. 570/204, 220, 228, 230, 570/226, 190, 216; 568/749, 755, 774

[56] References Cited

U.S. PATENT DOCUMENTS

| | | | |
|---|---|---|---|
| 2,725,405 | 11/1955 | Britton et al. | 570/204 |
| 2,822,617 | 3/1958 | Redman et al. | 570/204 |
| 2,949,491 | 8/1960 | Rucker | 570/204 |
| 4,351,978 | 9/1982 | Hatono et al. | 570/204 |
| 4,618,686 | 10/1986 | Boyer et al. | 524/176 |

FOREIGN PATENT DOCUMENTS

55196 6/1982 European Pat. Off.

OTHER PUBLICATIONS

Melody, M., "On the . . . Liability Encourages PCB Elimination in Transformers", Hazmat World, Feb. 1992, pp. 62-64.

Rodensky, R., et al., "Regulatory and Technological Trends in PCB Treatment and Disposal", Hazmat World, Feb. 1992, pp. 56-60.

Rylander, P., "Catalytic Hydrogenation over Platinum Metals", Academic Press 1967, pp. 405-431.

Baltzly, et al., "The Catalytic Hydrogenation of Halogen Compounds", pp. 261-365, 1946.

Coq, et al., "Conversion of Chlorobenzene over Palladium and Rhodium Catalysts", J. of Catalysts 101, 434-45 (1986).

Kawakami, et al., "Selectivity in Consecutive Hydrogenation of Chlorobenzene in Liquid Phase" 1975.

Mathe, et al., "Active Environment Protection: Hydrodehalogenation of Polychlorinated Compounds", Hazardous Waste: Detection, Control, Treatment, ed. by P. Abbou 1988, pp. 1615-1619.

Peeling, et al., "Effect of Amines on the Catalytic Hydrogenation of Chlorobenzene", Chemistry and Industry, 1958, pp. 362-363.

Kammerer, H., et al. "The Hydrogenation-Dehalogenation of Aromatic Hologen Compounds . . . ", Chem. Ber., 91, 1376-1379 (1958).

Chem. Abstracts, No. CA89(3): 23376d (1978).
Chem. Abstracts, No. CA87(3): 16747(f) (1977).
Chem. Abstracts, No. CA114(13): 121572u (1990).
Chem. Abstracts, No. CA114(12): 108253 ww (1990).

*Primary Examiner*—Werren B. Lone
*Attorney, Agent, or Firm*—Stephen I. Miller

[57] ABSTRACT

A process for hydrodehalogenating halogenated organic compounds present in a contaminated aqueous environmental source in which the halogenated organic compounds are reacted with hydrogen gas or a source of hydrogen gas in the presence of a catalyst of palladium on carbon.

9 Claims, No Drawings

METHOD OF HYDRODEHALOGENATING HALOGENATED ORGANIC COMPOUNDS IN AQUEOUS ENVIRONMENTAL SOURCES

FIELD OF THE INVENTION

The present invention is generally directed to the hydrodehalogenation of halogenated organic compounds in an aqueous medium in which the compounds are reacted with hydrogen or a source of hydrogen in the presence of palladium on a carbon substrate preferably under mild temperature and pressure conditions. The present invention is particularly suited for the removal of chlorinated hydrocarbons from aqueous contaminated environmental sources such as waste water and hazardous waste sites.

BACKGROUND OF THE INVENTION

The removal of halogenated organic compounds from aqueous environmental sources including halogenated aromatic compounds such as chlorobenzenes and chlorophenols and halogenated aliphatic compounds such as methylene chloride, trichloroethanes and trichloroethylene has posed serious problems. Typically, the halogenated compounds have been disposed of by separating, such as by steam stripping, using a microporous hollow-fiber membrane, or carbon adsorption, the contaminants from their aqueous environment and then subjecting the resulting concentrated levels of contaminants to incineration. However, the combustion of halogenated organic compounds often results in the production of highly toxic by-products such as dioxins. Thus, incineration can itself become an environmentally unsafe practice and its use for the disposal of halogenated organic compounds problematical.

Industry has therefore looked to alternative techniques for the destruction of halogenated hydrocarbons found in the environment. Among the techniques which have been studied are biological treatment and chemical dehalogenation.

Chemical dehalogenation methods have been developed as an alternative to incineration and land disposal because they convert the halogenated organic compounds to less toxic non-halogenated compounds. One such process employs a sodiumnaphthalene reagent to form sodium chloride and an inert sludge. While the sludge can be safely incinerated, the process is complicated by requiring an air-free reaction vessel which limits its application for on-site treatment of contaminated environmental sources. In another approach, a dechlorination reagent is formed by reacting an alkali metal with polyethylene glycol in the presence of heat and oxygen.

The above-mentioned processes, which involve the oxidative dechlorination of halogenated organic compounds, are generally highly sensitive to water. Such processes require a separation step to remove the halogenated compounds from the aqueous environment before they can be treated. In addition, elevated temperatures are often required to carry out the reaction [See S. Tabaei et al., "Dehalogenation of Organic Compounds" *Tetra. Let.* 32(24) pp. 2727-30 (Sept. 1991); M. Uhlir et al., "Recovery of Biphenyl by Catalytic Hydrogenolysis of Chlorinated Biphenyls" *Chem. Abstr.* 114 (23): 228496Z; and processes referred to in N. Surprenant et al., "Halogenated-Organic Containing Wastes" pp. 224-231 Noyes Data Corp. (1988)]. Accordingly, these processes have not been widely accepted for the decontamination of environmental sites.

There has been developed a reductive process for the dehalogenation of halogenated organic compounds. J. F. A. Kitchen, U.S. Pat. No. 4,144,152 discloses a process for the treatment of halogenated organic compounds with UV radiation and hydrogen in the absence of an oxidizing agent. While this process may be conducted in an aqueous environment, the requirement of a UV radiation reactor has made light activated reduction of chemicals (LARC) processes of the type disclosed in U.S. Pat. No. 4,144,152 of limited commercial value.

There is therefore a need for processes in which halogenated organic compounds can be removed directly from aqueous contaminated environmental sources in a safe and cost effective manner. Such processes should be able to be conducted under mild reaction conditions and be effective in treating contaminated sources having very low concentrations of contaminants as is likely to be found in waste streams.

SUMMARY OF THE INVENTION

The present invention is directed to a process of hydrodehalogenating halogenated organic compounds and particularly those typically found in aqueous contaminated environmental sources such as waste streams and the ground water found at hazardous waste disposal sites. In accordance with the invention, the halogenated organic compounds are removed directly from the aqueous environment, without expensive radiation equipment, in a cost effective manner.

The concentration of the contaminants which may be treated in the present process can be in the parts per million range. Specifically, the present invention can treat aqueous streams containing as little as 2 ppm of contaminants. Of course, the process described herein is effective in treating waste streams containing much higher concentrations of halogenated contaminants on the order of 1,000 ppm or more. Typical aqueous waste streams have a halogenated organic content of about 100 to 200 ppm.

In particular, the halogenated organic compounds, particularly chlorinated hydrocarbons, are reacted with hydrogen gas or a source of hydrogen gas in the presence of a catalyst consisting essentially of palladium on a carbon substrate. The reaction is conducted directly on the waste stream without a prior separation step to convert the halogenated hydrocarbons to less toxic hydrocarbons. A by-product of the reaction is hydrogen chloride which is produced in environmentally safe concentrations. The present invention therefore provides a safe and economically feasible method of treating sources of environmental pollution.

DETAILED DESCRIPTION OF THE INVENTION

The present invention is based on the surprising finding that halogenated organic compounds, particularly substituted and unsubstituted chlorinated aliphatic and aromatic hydrocarbons can be hydrodehalogenated in situ in an aqueous medium by reduction with hydrogen in the presence of a catalyst of palladium on a carbon substrate. As used herein "palladium" means elemental palladium or a palladium compound (e.g. palladium oxide) which can be reduced in the presence of hydrogen gas or a source of hydrogen gas. Because carbon is hydrophobic, it was surprising to find that carbon could be used effectively as a substrate for palladium in an aqueous medium to dechlorinate low concentrations of halogenated hydrocarbons.

The carbon substrates may be any of those customarily employed to support a noble metal catalyst. The amount of palladium metal on the carbon substrate is generally in the range of from 2 to 10% by weight, preferably about 5% by weight. Higher concentrations of palladium may be used, but any reaction rate increase is substantially offset by the increased cost of the palladium. The amount of the catalyst employed in the reaction varies depending on the concentration of halogenated hydrocarbon.

Hydrogen is supplied to the reaction as a gas or in the form of a compound capable of delivering hydrogen gas. The preferred compounds for this purpose are hydrazine, hydrazine compounds and borohydrides. The hydrazine compounds include, for example, hydrazine hydrate, hydrazine sulfate, hydrazine chloride and the like. Alkali metal borohydrides such as sodium borohydride and potassium borohydride are the preferred borohydride sources of hydrogen. The amount of hydrogen used in the reaction should be sufficient to replace the removed chloride ions with hydrogen and is therefore at or above a stoichiometric amount.

In accordance with the invention, it is preferred to employ hydrogen gas as the reducing agent when hydrodehalogenating aliphatic halogenated compounds such as methylene chloride an dichloroethane. Both hydrogen gas and other sources of hydrogen such as hydrazine can be used to hydrodehalogenate aromatic halogenated compounds such as chlorobenzene and chlorophenols.

A basis proton acceptor may optionally be employed to assist the reaction when the aqueous stream contains higher concentrations (e.g. at least 100 ppm) of the halogenated organic compouids, and/or when aromatic compounds are present. Examples of the basis proton acceptor include ammonium hydroxide, sodium hydroxide, sodium acetate and organic amines such as triethylamine. Ammonium hydroxide is the preferred proton acceptor. The proton acceptor is preferably added in an amount equal to or exceeding a stoichiometric amount.

The reduction reaction of the present invention is preferably conducted under mild temperature and pressure conditions. The temperature of the reaction may be as low as ambient temperature. The upper temperature is limited by the boiling point of the aqueous stream, the halogenated compounds contained therein, and/or the type of reactor. The upper temperature limit is also established by the decomposition temperature of hydrazine (120° C.) and the other sources of hydrogen when they are used in the reaction. It is generally desirable to maintain the temperature of the reaction within the range of from ambient temperature to 50° C.

The reaction pressure is preferably maintained within the range of from atmospheric pressure to 50 psig. It is preferred to conduct the reaction at or near atmospheric pressure. On the other hand, if the reaction is conducted on waste streams containing more highly concentrated amounts of halogenated organic compounds, the reaction is preferably conducted at slightly elevated pressures of from 10 to 50 psig.

The present invention may be employed to hydrodehalogenate a wide variety of substituted and unsubstituted halogenated organic compounds commonly found in contaminated environmental sources such as waste streams or the ground water found at hazard waste disposal sites. Among the compounds which are most commonly associated with these sources are chlorobenzenes, methylene chloride, trichloroethanes, trichloroethylene, chlorophenols and chlorinated pesticides including dichlorodiphenyltrichloroethane, Dieldrin, Aldrin, Toxaphene, Chlordane, Kepone and Mirex. The respective structures and chemical formulas of these pesticides are found in *The Merck Index*, Ninth Edition (1976), incorporated herein by reference.

Chlorobenzenes are typically used as a chemical feed stock and solvent. Methylene chloride is currently employed as a paint remover, a degreasing solvent and as a chemical processing solvent. Trichloroethanes are commonly used as a vapor degreaser for printed circuit boards and in metal cutting lubricants. Trichloroethylene is widely used as a degreasing solvent and in the manufacture of polyvinylchloride. Chlorophenols have a number of commercial uses including antibacterial and germicidal agents, disinfectants and wood preservatives.

Accordingly, large amounts of these toxic chemicals are employed in industry and in agriculture. Their disposal has become of major interest to government and industry alike who are concerned with protecting the environment from contamination with hazardous waste. The present invention provides a safe and economical means of detoxifying hazardous waste streams at the site of the contamination.

The types of reactors which may be used to carry out the process of the present invention are well known to those skilled in the art. Such reactors include fixed bed systems such as trickle-bed reactors, slurry bed reactors and the like. A discussion of the operation of such reactors and their structural components are described in P. A. Ramachandran et al. "Three-Phase Catalytic Reactors" (Gordon and Breach Science Publishers, 1983) and Charles Satterfeld, "Heterogenous Catalysis in Practice", Chap. XI, pp 312–369, McGraw Hill (1980), each incorporated herein by reference.

A trickle bed reactor generally includes a tube having a suitable catalyst such as a noble metal on a support packed along its entire length. The reactor has an inlet for receiving a liquid (e.g. a waste stream) and hydrogen gas which are brought into contact and mixed optionally in the presence of an inert material such as α-alumina. The liquid and hydrogen pass through the catalyst bed and the product (e.g. dehalogenated hydrocarbons) is taken from the bottom of the reactor.

The following examples are illustrative of embodiments of the invention and are not intended to limit the invention as encompassed by the claims forming part of the application.

EXAMPLE 1

A 550 ml sample of groundwater was taken from a test well at a remediation site where the aquifer had been contaminated with degreasing solvents. The water was filtered to remove suspended solids then analyzed and found to contain 132 ppm trichloroethylene (TCE) and 7.5 ppm trichloroethane (TCA).

The contaminated groundwater was placed in a 1,000 ml Parr autoclave using one gram/liter of prereduced 5% palladium on carbon (w/w) catalyst used in the form of a 50% water wet material (ESCAT 111 made by Engelhard Corporation). The dechlorination reaction was carried out at 23° C. under a hydrogen pressure of 25 psig and at a stirring rate of 750 rpm. After two hours, the concentration of trichlorethylene decreased to 0.8 ppm and the trichloroethane was no longer detectable. The chloride ion content of the water was analyzed and the results corresponded to a 93% conversion of the chlorinated compounds to the corresponding non-chlorinated compounds.

EXAMPLE 2

An aqueous solution containing 660 mg/1 of monochlorobenzene was placed in an autoclave with one g/l of the 5% palladium on carbon catalyst employed in Example 1. The temperature of the solution was raised slightly to 30° C. and the autoclave was pressurized with hydrogen to 45 psig. After thirty minutes, the chloride level in the solution increased to an amount which corresponded to a 55% dehalogenation of chlorobenzene.

EXAMPLES 3-9

A contaminated waste stream containing 186.3 ppm of trichloroethane was fed into a trickle bed reactor at rates varying from 0.024 to 0.46 ml/sec.

The reactor contained a 2.54 cm diameter reactor tube packed with 31.4 gm of a non-prereduced 0.8% w/w palladium on granular carbon catalyst (ESCAT 18 made by Engelhard Corporation) having an average particle size of 0.45 mm. The density of the catalyst bed was 0.503 gm/cm$^3$ and the catalyst volume was 62.3 ml.

Hydrogen gas was supplied to the reactor at rates varying from 2.5 to 13 ml/sec. The rate of delivery of hydrogen was in excess and proportional to the flow rate of the waste stream. The reactor was maintained at a temperature of 24° C.

The chloride ion concentration as well as the trichloroethane concentration were measured at the outlet of the reactor and the conversion of trichloroethane to non-chlorinated products was determined and the results are shown in Table 1.

As shown in Table 1, the process of the present invention is very effective in converting trichloroethane to non-chlorinated compounds particularly at the slower feed rates of those tested. For example, the concentration of trichloroethane in the waste stream was reduced from 186.3 ppm to 35.4 ppm (81% conversion) with a single pass through the reactor. Improved conversions can be obtained by recycling the treated waste stream through the reactor, increasing the residence time, increasing the reaction temperature or combination thereof.

As further shown in TABLE 1, the amount of chlorinated hydrocarbon removal is substantially inversely proportional to the feed rate. Accordingly, a particular feed rate may be selected which will obtain the desired reduction in trichloroethane content by a single or multiple pass.

EXAMPLES 10-16

The procedure carried out in Examples 3-9 was repeated using a waste stream having a trichloroethane concentration of 103 ppm. The results are shown in Table 2.

TABLE 2

| EXAMPLE | LIQUID FLOW RATE (ml/s) | CHLORIDE ION CONCENTRATION IN OUTLET (ppm) | TCA CONCENTRATION IN OUTLET (ppm) | CONVERSION % |
| --- | --- | --- | --- | --- |
| 10 | 0.024 | 61.73 | 25.75 | 75.00 |
| 11 | 0.041 | 52.98 | 36.59 | 64.48 |
| 12 | 0.1475 | 19.07 | 79.10 | 23.21 |
| 13 | 0.217 | 14.24 | 85.15 | 17.33 |
| 14 | 0.2936 | 10.93 | 89.27 | 13.33 |
| 15 | 0.375 | 9.62 | 90.94 | 11.71 |
| 16 | 0.46 | 5.47 | 96.13 | 6.67 |

The results in Tables 1 and 2 show that the extent of the hydrodehalogenation reaction is independent of inlet concentration. The chlorinated hydrocarbon level in the resulting fluid can be reduced further or even eliminated by increasing the residence time, the number of passes through the catalyst bed, the reaction temperature or combination thereof.

EXAMPLES 17-23

The procedure carried out in Examples 3-9 was substantially repeated on a waste stream having a concentration of trichloroethylene of 105.3 ppm. The results are shown in Table 3.

TABLE 1

| EXAMPLE | LIQUID FLOW RATE (ml/s) | CHLORIDE ION CONCENTRATION IN OUTLET (ppm) | TCA CONCENTRATION IN OUTLET (ppm) | CONVERSION % |
| --- | --- | --- | --- | --- |
| 3 | 0.024 | 120.36 | 35.4 | 81 |
| 4 | 0.041 | 95.07 | 67.13 | 63.97 |
| 5 | 0.063 | 71.00 | 97.30 | 47.78 |
| 6 | 0.088 | 53.46 | 119.28 | 35.97 |
| 7 | 0.1475 | 35.64 | 141.82 | 23.98 |
| 8 | 0.2936 | 20.29 | 160.87 | 14.07 |
| 9 | 0.46 | 10.40 | 173.26 | 7.0 |

TABLE 3

| EXAMPLE | LIQUID FLOW RATE (ml/s) | CHLORIDE ION CONCENTRATION IN OUTLET (ppm) | TCE CONCENTRATION IN OUTLET (ppm) | CONVERSION % |
| --- | --- | --- | --- | --- |
| 17 | 0.038 | 75.98 | 11.50 | 89.08 |

TABLE 3-continued

| EXAMPLE | LIQUID FLOW RATE (ml/s) | CHLORIDE ION CONCENTRATION IN OUTLET (ppm) | TCE CONCENTRATION IN OUTLET (ppm) | CONVERSION % |
| --- | --- | --- | --- | --- |
| 18 | 0.041 | 72.63 | 15.63 | 85.15 |
| 19 | 0.088 | 54.90 | 37.52 | 64.37 |
| 20 | 0.1475 | 37.62 | 58.86 | 44.11 |
| 21 | 0.2936 | 22.45 | 77.58 | 26.32 |
| 22 | 0.435 | 19.73 | 80.91 | 23.16 |

EXAMPLES 24–29

The procedure of Examples 3–9 were substantially repeated on a waste Stream having a concentration of trichloroethylene of 152.8 ppm. The results are shown in Table 4.

TABLE 4

| EXAMPLE | LIQUID FLOW RATE (ml/s) | CHLORIDE ION CONCENTRATION IN OUTLET (ppm) | TCE CONCENTRATION IN OUTLET (ppm) | CONVERSION % |
| --- | --- | --- | --- | --- |
| 24 | 0.038 | 118.55 | 7.33 | 95.2 |
| 25 | 0.063 | 101.02 | 28.08 | 81.62 |
| 26 | 0.088 | 84.62 | 48.33 | 68.37 |
| 27 | 0.1475 | 57.18 | 82.21 | 46.20 |
| 28 | 0.2936 | 33.66 | 111.24 | 27.20 |
| 29 | 0.435 | 27.37 | 119.02 | 22.11 |

EXAMPLE 30

A 1,000 ml Parr autoclave was charged in air with 5.00 g (38.9 mmol) of 4-chlorophenol, 2.9 ml (42.9 mmol) of ammonium hydroxide, 0.450 of 5% palladium on carbon (ESCAT 111 manufactured by Engelhard Corporation), and 500 ml of water. The autoclave was then sealed and connected to a gas delivery system containing a gas manifold, a gas regulator for maintaining constant hydrogen pressure within the autoclave, and a calibrated, 500 ml gas reservoir for monitoring hydrogen consumption during the course of the reaction. The reservoir pressure was maintained at 70 psi while the autoclave pressure was maintained at 35 psi. The gas delivery system (manifold and reservoir) was charged and vented three times with argon and then charged a fourth time with argon. The autoclave then was purged with argon in a similar manner and heated under pressure to 35° C. via an external, constant temperature heating bath.

Subsequently, the gas delivery system and autoclave were purged with hydrogen three times by the same charge/vent procedure described previously. After charging the autoclave a fourth time with hydrogen, mechanical stirring was started (520 rpm), and the reservoir was isolated from the tank gas supply via a shut-off valve in the manifold system. The pressure drop in the gas reservoir was monitored via a strip chart recorder and digital pressure readout. The reaction mixture was sampled periodically and its composition was assayed by gas chromatography. The initial rate over the first 1.2 minutes of reaction was obtained from the hydrogen consumption curve, and a quantitative phenol yield was determined by gas chromatography. The results are shown in Table 5.

EXAMPLE 31

A 1,000 ml Parr autoclave was charged in air with 5.00 g (38.9 mmol) of 4-chlorophenol, 4.2 ml (62.1 mmol) of ammonium hydroxide, 0.225 g of ESCAT 111, 2.70 g (85% w/w, 45.8 mmol) of hydrazine hydrate, and 500 ml of water. The autoclave was sealed without pressurizing or purging, and mechanical stirring (520 rpm) was begun immediately. The reaction mixture was sampled periodically and its composition was assayed by gas chromatography. Quantitative phenol yield as a function of time was determined by gas chromatography and the data was fit to a simple first order kinetic expression. The results are shown in Table 5.

TABLE 5

| EXAMPLE | CHLORIDE COMPOUND | REDUCTANT | BASE | TEMP | YIELD PHENOL | REACTION TIME | INIT. RATE |
| --- | --- | --- | --- | --- | --- | --- | --- |
| 30 | 4-CP* | $H_2$ | $NH_4OH$ | 35° C. | ≧99% | 60 min | 4.69 mmol/min |
| 31 | 4-CP | Hyd-Hyd** | $NH_4OH$ | 25° C. | ≧99% | 21 hrs | 0.20 mmol/min |

We claim:

1. A method of hydrodehalogenating chlorinated aliphatic hydrocarbons from a substantially aqueous contaminated waste stream suspected of suspected of containing halogenated hydrocarbons comprising passing the waste stream into contact with hydrogen gas or a source of hydrogen gas selected from hydrazine, hydrazine hydrate, hydrazine salts and borohydrides in the presence of a catalyst consisting essentially of palladium on carbon at a temperature of from ambient temperature to 50° C. and at a pressure of from atmospheric pressure to 50 psig.

2. The method of claim 1 wherein the reaction is conducted at a pressure of from atmospheric pressure to 50 psig.

3. The method of claim 1 wherein the reaction is conducted at a temperature of from ambient temperature to 50° C.

4. The method of claim 1 further comprising conducting the reaction in the presence of a basic proton acceptor chosen from among ammonium hydroxide, sodium hydroxide, sodium acetate and organic amines.

5. The method of claim 4 wherein the basic proton acceptor is ammonium hydroxide.

6. The method of claim 5 wherein the amount of the basic proton acceptor is equal to or in excess of a stoichiometric amount.

7. The method of claim 1 comprising treating said medium with an amount of hydrogen gas equal to or in excess of a stoichiometric amount.

8. The method of claim 1 wherein the source of hydrogen gas is selected from the group consisting of hydrazine, hydrazine hydrate, hydrazine salts and borohydrides.

9. The method of claim 1 wherein the waste stream includes at least one halogenated compound selected from the group consisting of trichloroethanes, trichloroethylene, methylene chloride.

* * * * *